United States Patent
Dennis et al.

(10) Patent No.: US 10,643,234 B1
(45) Date of Patent: May 5, 2020

(54) PRE-LOADED NATIVE APPLICATION TRACKING SERVICE

(71) Applicant: Sprint Communications Company L.P., Overland Park, KS (US)

(72) Inventors: Drew T. Dennis, Gardner, KS (US); M. Jeffrey Stone, Boynton Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 479 days.

(21) Appl. No.: 15/653,345

(22) Filed: Jul. 18, 2017

(51) Int. Cl.
*G06Q 30/02* (2012.01)
*G06F 3/048* (2013.01)

(52) U.S. Cl.
CPC ......... *G06Q 30/0246* (2013.01); *G06F 3/048* (2013.01); *G06Q 30/0267* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2013/0097008 | A1* | 4/2013 | Kaniel | G06Q 50/01 705/14.41 |
| 2014/0278927 | A1* | 9/2014 | Close | G06Q 30/0246 705/14.45 |
| 2014/0282358 | A1* | 9/2014 | Mowatt | G06F 8/70 717/104 |
| 2014/0330640 | A1* | 11/2014 | Liu | G06Q 30/0246 705/14.45 |
| 2018/0322525 | A1* | 11/2018 | Ungerer | G06Q 30/0242 |

* cited by examiner

*Primary Examiner* — Sam Refai
*Assistant Examiner* — Kyle G Robinson

(57) ABSTRACT

A mobile communication device is disclosed. The device comprises a processor, a memory, a display, an input device, and a tracking client pre-loaded native application stored in the memory and referenced by a uniform resource identifier (URI). When executed by the processor the client application receives a tracking identity of a mobile advertisement from another application installed on the device sent based on the URI associated with the client application. In response to receiving the tracking identity of the mobile advertisement, the client application stores a log of a click input associated with the mobile advertisement, and in response to receiving the tracking identity of the mobile application, transmits a click message to an application store. The application further establishes a reliable communication connection to an event tracking server and transmits the log of the click input via the reliable communication connection to the event tracking server.

20 Claims, 8 Drawing Sheets

PRE-LOADED NATIVE APPLICATION TRACKING SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones are widely deployed and have become very functional devices. Many users download mobile applications after initial purchase of their phones to customize and extend the functionality of their phones. Mobile applications may comprise gaming mobile applications, social networking mobile applications, news feed mobile applications, and others. Advertisements for mobile applications may be presented in a display window proximate to other content. By clicking on the advertisement for a mobile application, a user may navigate to an application store where further information about the mobile application may be reviewed and where the mobile application may be downloaded and installed on their mobile phones.

SUMMARY

In an embodiment, a method of communicating events generated by a mobile communication device is disclosed. The method comprises receiving a mobile advertisement by a mobile communication device, where the ad comprises a creative content associated with a mobile application, a uniform resource identifier (URI), and a tracking identity associated with the mobile application, where the URI references an event tracking client application that is installed as a pre-loaded native application on the mobile communication application and that executes on the mobile communication device. The method further comprises presenting the creative content on a display of the mobile communication device; receiving a click input to the creative content by the mobile communication device, providing the tracking identity to the event tracking client application, storing a log of the click input by the event tracking client application, where the log comprises the tracking identity, and transmitting a click message to an application store by the event tracking client application, where the click message comprises a uniform resource identifier (URI) identifying content associated with the mobile application stored by the application store. The method further comprises establishing a reliable communication connection to an event tracking server by the event tracking client application and transmitting the log of the click input by the event tracking client application via the reliable communication connection to the event tracking server. The method further comprises receiving the log of the click input by the event tracking server, accessing information in a data store by the event tracking server based on the tracking identity of the log of the click input, where the accessed information identifies a reference to a server, and transmitting a notification of the click input and the tracking identity by the event tracking server to the server associated with the reference identified in the accessed information, whereby the event of a click through on the mobile advertisement is reliably communicated from the mobile communication device to stakeholders in a distribution chain of the mobile application and the mobile communication device is enabled to access information about the mobile application from the application store.

In another embodiment, a mobile communication device is disclosed. The mobile communication device comprises a processor, a non-transitory memory, a display, an input device, and a tracking client pre-loaded native application stored in the non-transitory memory and referenced by a uniform resource identifier (URI). When executed by the processor, the tracking client pre-loaded native application receives a tracking identity of a mobile advertisement presented on the display from another application installed on the mobile communication device sent based on the URI associated with the tracking client pre-loaded native application, in response to receiving the tracking identity of the mobile advertisement, stores a log of a click input associated with the mobile advertisement, and in response to receiving the tracking identity of the mobile application, transmits a click message to an application store, where the click message comprises a uniform resource identifier (URI) identifying content associated with the mobile application stored by the application store. The tracking client pre-loaded native application further establishes a reliable communication connection to an event tracking server and transmits transmitting the log of the click input via the reliable communication connection to the event tracking server.

In yet another embodiment, a method of communicating events generated by a mobile communication device is disclosed. The method comprises receiving a mobile advertisement by a mobile communication device, where the ad comprises a creative content associated with a mobile application, a uniform resource identifier (URI), and a tracking identity associated with the mobile application, where the URI references an event tracking client application that is installed on the mobile communication application and that executes on the mobile communication device. The method further comprises presenting the creative content on a display of the mobile communication device; receiving a click input to the creative content by the mobile communication device, providing the tracking identity to the event tracking client application, storing a log of the click input by the event tracking client application, where the log comprises the tracking identity, and transmitting a click message to an application store by the event tracking client application, where the click message comprises a uniform resource identifier (URI) identifying content associated with the mobile application stored by the application store. The method further comprises establishing a communication connection to an event tracking server by the event tracking client application and transmitting the log of the click input by the event tracking client application via the communication connection to the event tracking server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
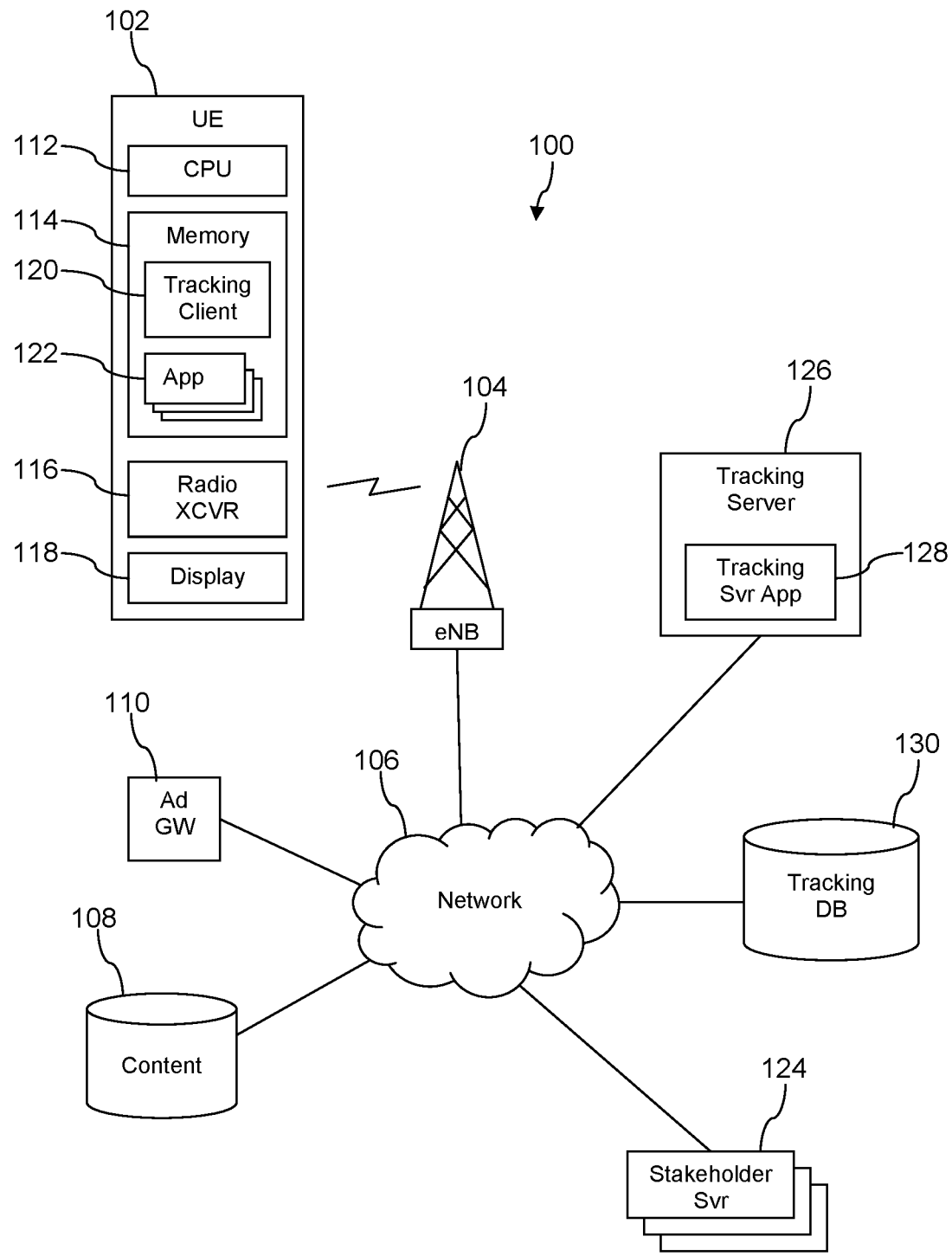
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Existing infrastructures for promoting mobile applications, installing mobile applications, and distributing referral notifications associated with user interactions with mobile applications (i.e., applications installed and executed on a mobile communication device) suffer from a variety of shortcomings. If multiple parties are involved in the promotion of a mobile application—for example an application developer, an application publisher, an application distribution affiliate—each may have a claim to share in the revenue stream associated with the mobile application. At present, when a user of a mobile communication device clicks on a URL to see more details about an advertised mobile application, the message transmitted by the mobile device in response to this user click may experience a series of redirects, passing in turn through servers belonging to each party to the revenue stream so they can lay claim to their share in the value chain, before ultimately reaching the proposed destination, for example an application store where the device can browse further details about the mobile application and/or to download the mobile application. These redirects may be distracting to users and can introduce delays of from 5 seconds up to 60 seconds. Further, the redirect chains are vulnerable to failure. For example, if one of the servers along the redirect path is overloaded, the server may drop the incoming message and the redirect chain is broken.

Another shortcoming of the existing system for promoting and distributing mobile applications comes in how the event of mobile installation is propagated. This is done by triggers built into the mobile application activating when the mobile application is launched on a device for the first time and then sending notification back to one or more parties. If the mobile communication device happens to be out of wireless coverage at the time, this event or notification does not propagate back. Additionally, the initial launch of the mobile application may not follow closely in time after the installation of the mobile application, which makes identifying alignment of an initial click through associated with presentation of an ad for the application and with the user reaction of installing the application difficult (e.g., interferes with attribution of installation to the ad).

The present disclosure teaches a pre-loaded native application tracking service that constitutes a new technical solution for tracking and notifying interactions with mobile applications that enables participants in the value chain to claim their due share of the value they help generate and that provides improved reliability of downloads to the user of the mobile communication device. As taught further herein, an event tracking client application that receives and responds to click events from mobile application advertisements is installed as a pre-loaded native application on the mobile communication device. The use of this pre-loaded native application contrasts with the conventional approach of building a tracking service software development kit (SDK) into each mobile application that desires to track installs initiated from its execution context. A pre-loaded native application is adapted to the hardware of a specific mobile communication device and is installed during the manufacturing process, for example installed as part of the firmware. A pre-loaded native application typically has access to operating system services and to peripheral devices on the mobile communication device that user applications may not be granted, for example to avoid untested and/or corrupted user applications from degrading service of the device and/or of a wireless communication network. Said in other words, a pre-loaded native application may be granted operating system access privileges that are greater than the access privileges granted to user installed mobile applications. Pre-loaded native applications may be considered by original equipment manufacturers (OEM) and/or wireless communication service providers to be inherently more secure because the OEM can control the testing of and exercise configuration control over the pre-loaded native applications that they install on the device during manufacturing.

The mobile application advertisement, instead of being associated with a URL directing to content off the mobile communication device (e.g., content at an application store), is associated with a uniform resource identifier (URI) that refers to the client. When the ad is clicked on, the URI passes information to the client, for example a tracking identity associated with the mobile application promoted by the ad. The client logs the click event together with the tracking identity. The client then propagates the click to an application store associated with the mobile application that is the subject of the ad. The client may send information about the click to the application store in a message. This message to the application store may comprise an identity representing the advertised mobile application, an advertisement campaign identity, and/or an identity representing the specific click transaction. This application store may be identified in the ad. Alternatively, the client may determine the application store based on mapping from the tracking identity to the application store identity or URI, for example using a local look-up table or by sending a query for the application store identity in a message containing the tracking identity to an event tracking server. The application store then interacts with the mobile communication device, for example presenting information on the subject mobile application in a display window, providing a control for navigating to browse additional information about the mobile application, and providing a control for selecting downloading and installing the mobile application.

At a later time, the event tracking client application sends the logged click event to the event tracking server. The client application may aggregate a plurality of logged click events and send the aggregation of click events to the event tracking server periodically, for example once per hour, once per day, or on some other interval. The client application may transmit the logged click events over a reliable communication channel, for example a channel using an ACK/NACK protocol. If the transmitted log of click events is not received by the tracking server, the client may not receive an ACK response and, in that case, may try resending the log of click events until an ACK response is received. The client application may compute a cyclic redundancy check (CRC) value on the log of click events and send the CRC value with the log of click events to the tracking server. The tracking server can compute a CRC value over the log of click events and compare to the CRC value sent in the log message. If the CRC values do not agree, the tracking server may return a NACK to the client on the mobile communication device. In this way, the reliability of the transmission of the log of click events can be enhanced.

The tracking server can look up a notification party based on the tracking identity provided in each of the logs and send an appropriate notification message to that notification party. Again, this communication can be conducted using a reliable communication channel, for example a channel using an ACK/NACK protocol. The notification party can then share the notification of the click event to other parties in the value chain. In this way, the notification of the click events can propagate reliably and run a much reduced risk of being lost or simply dropped due to congestion on an intermediate server. Alternatively, the tracking identity may be associated to a plurality of notification parties, and the tracking server may send the notification message to each of the associated notification parties.

The client application can listen to mobile application installation events on the mobile communication device. When an install occurs, the client application can obtain a tracking identity associated with the installed mobile application and log this event with the tracking identity for later transmission to the tracking server over the same kind of reliable channel. The tracking server can look up the notification party based on the tracking identity and send an appropriate installation notification message to the notification party via a reliable channel, for example using an ACK/NACK protocol. The notification party can distribute notification to other parties in the value chain.

In an embodiment, the tracking server can match an installation event with a corresponding click event based on the tracking identity associated with each event. The tracking server can then evaluate an elapsed time and determine if an attribution criteria has been met (e.g., if the elapsed time is short enough that the installation can be deemed to be the result of the previous click event, for example a click on an advertisement about the subject mobile application). If the attribution criteria are met, the tracking server generates an attribution event and sends notification of this attribution event to the notification party or to an advertising party via a reliable channel, for example using an ACK/NACK protocol. It is noted that this particular information technology implementation shortens the elapsed time relative to the conventional evaluation of attribution that is tolled based on when a mobile application is first launched not when it is first installed. It may be the case that a mobile application is not launched until one or more days after it is first installed, which may often defeat attribution of the installation to the advertisement that actually induced a user to download and install the mobile application. In the conventional tracking processes, mobile applications embed a trigger that is activated on first execution of the mobile application, and the trigger causes the mobile application to transmit a notification of this first execution event. The present system, by using the client application on the mobile communication device to generate this notification, and due to the status of the client application as a native installed application that has access to low-levels of the operating system (e.g., to monitor and/or to receive notice of mobile application installation events), improves on the conventional process by generating notification on the event of initial installation of the mobile application (rather than notification being made on the event of first execution of the application).

Turning now to FIG. 1, a system 100 is described. In an embodiment, system 100 comprises a mobile communication device 102 or user equipment (UE), a cell site 104, a network 106, a content source 108, and an advertising gateway 110. The network 106 comprises one or more public networks, one or more private networks, or a combination thereof. The cell site 104 may provide a wireless communication link to the mobile device 102 and provide the device 102 communication coupling to the network 106. The cell site 104 may provide the wireless communication link to the device 102 according to one or more of a long term evolution (LTE), a code division multiple access (CDMA), a global system for mobile communications (GSM), a worldwide interoperability for microwave access (WiMAX) wireless communication protocol or another wireless communication protocol. In some contexts, the cell site 104 may be referred to as an enhanced node B (eNB), a base transceiver station (BTS), or another term. In an embodiment, in the place of the cell site 104, a short range radio access point (AP), such as a WiFi access point or WiFi hotspot, may provide a wireless communication link to the mobile device 102 and provide the device 102 communication coupling to the network 106.

The mobile communication device 102 may be a mobile phone, a smartphone, a personal digital assistant (PDA), a media player, a wearable computer, a headset computer, a laptop computer, a tablet computer, or a notebook computer. The mobile communication device 102 may access content, such as web content, from the content source 108. During presentation of the web content, an advertisement opportunity may be available in a sidebar or other location in the presentation of the content. The advertising gateway 110 may supply a mobile advertisement to be presented on a display of the device 102 adjacent to the presentation of web content. Alternatively, a mobile application may execute on the device 102, such as a gaming mobile application, that provides opportunities for presentation of mobile advertisements, for example adjacent to a display of a gaming scenario. It is understood that the system 100 may comprise any number of mobile communication devices 102, cell sites 104, APs, advertising gateways 110, and content sources 108.

In an embodiment, the mobile communication device 102 comprises a processor 112, a memory 114, at least one radio transceiver 116, and a display 118. The memory 114 may comprise a non-transitory memory portion such that data or instructions stored in the non-transitory memory portion are retained through power off/power on cycles (e.g., through reboots and power cycles). An event tracking client application 120 may be stored in the non-transitory portion of the memory 114. One or more applications 122 may likewise be stored in the non-transitory portion of the memory 114. The applications 122 may comprise a web browser. The applications 122 may comprise one or more mobile gaming application, one or more mobile social networking application, or one or more of both. The radio transceiver 116 promotes the device 102 establishing wireless communication links with the cell site 104 and/or with a short range radio AP such as a WiFi AP.

When the application 122 presents a mobile advertisement, for example a mobile advertisement promoting a mobile application, the mobile advertisement may send an event to a uniform resource identifier (URI) that references the event tracking client application 120 (hereinafter referred to as the client or the client application). The mobile advertisement may be developed, for example by a third party advertisement firm or by a mobile application developer, using a software development kit (SDK) that embeds a method for sending the event to the URI of the client 120. The SDK may be adapted to align mobile advertisements with the event tracking services taught herein. The event which the mobile application 122, in the course of rendering the mobile advertisement, sends to the client 120 comprises a tracking identity and optionally a uniform resource locator (URL) associated with an application store where additional information about the advertised mobile application can be obtained. It is understood that a mobile application that was not developed with the SDK and/or was not created to use the tracking services taught herein may be processed in the conventional manner by the application 122.

The client 120 performs two separate tasks in response to receiving the event from the application 122. The client 120 sends a request on behalf of the application 122 for the content referenced by a URL that may be embedded in the event received from the application 122. This content may comprise further details about the advertised mobile application and controls to select downloading and installing the mobile application on the device 102. The requested content may be transmitted to the device 102 and presented on the display 118, for example in a new window that is opened in response to a user click input (i.e., a "click through" input). In an embodiment, rather than the URL being conveyed to the client 120 in the event sent to it by the mobile application 122, the client 120 may be configured with the URL of the application store. Alternatively, the client 120 may use the tracking identity to request the URL of the appropriate application store from an event tracking server 126.

The client 120 also creates a log associated with the event that records at least the tracking identity. The client 120 at some later time (i.e., asynchronously with reference to the event of receiving the click through input) sends the log, possibly along with other logs associated with other click through input events, to an event tracking server application 128 executing on the event tracking server 126. The client 120 may send event logs to the event tracking server 126 periodically, for example once per hour, once per day, once per week or on some other periodic basis. The client 120 may send event logs aperiodically when the numbers of accumulated logs exceed a predefined threshold, for example an accumulation of 5 logs, an accumulation of 8 logs, an accumulation of 10 logs, or some other number of logs. It is understood that the sending of logs by the client 120 to the event tracking server 126 may combine both periodic transmission of logs and aperiodic transmission of logs (e.g., when the number of accumulated logs exceed the predefined threshold before the period expires). It is noted that the client 120 may send logs not only about click through inputs but also logs about mobile application installation events as described further hereinafter. Said in other words, when the client 120 sends an aggregation of logs to the tracking server 126, this aggregation of logs may comprise one or more logs related to click through input events and one or more logs related to mobile application installation events.

In an embodiment, the client 120 sends the logs to the event tracking server 126 via a reliable communication channel. For example, the client 120 may establish a reliable communication connection to the event tracking server 126 and then send the event logs to the event tracking server 126 via the reliable connection. The reliable communication connection may be provided by a reliable data communication protocol. The reliable communication connection may employ an ACK/NACK mechanism such that the event tracking server 126, in response to receiving a log over the reliable connection, sends an ACK message to the client 120 if the event log message is received in good condition or sends a NACK message to the client 120 if the event log message is not received in good condition. If the client 120 receives a NACK message or does not receive a timely response from the event tracking server 126, (i.e., does not receive either an ACK or a NACK within a predefined period of time) the client 120 may resend the event log.

The client 120 may determine a cyclic redundancy check (CRC) value over the content of the event log message and append the CRC to the event log message. The event tracking server application 128 can determine the CRC for itself over the received content of the event log message and compare its CRC to the CRC appended to the event log message. If the two CRCs agree, the message may be deemed received in good condition; if the CRCs do not agree, the message may be deemed received in bad condition. Alternatively, the client 120 may determine a different digest value over the event log message and append the digest value to the event log message for confirmation of message integrity by the event tracking server application 128.

The event tracking server application 128 parses the event log or logs received from the device 102 to extract the tracking identities. The event tracking server application 128 accesses a tracking data store 130 via the network 106 using the tracking identities to select an entry associated with each tracking identity. The entry associates the tracking identity to one or more references or addresses of stakeholder servers 124 that are associated with the value chain of the mobile application and/or the mobile advertisement. The tracking server application 128 then sends notifications about the event received in the event log to each of the stakeholder servers 124 whose references are associated to the tracking identity by the entry in the tracking data store 130. In an embodiment, the entry comprises a single reference, the event tracking server application 128 sends an event notification to that referenced stakeholder server 124, and the stakeholder server 124 is responsible for identifying and notifying other stakeholder servers 124.

Figure 2:
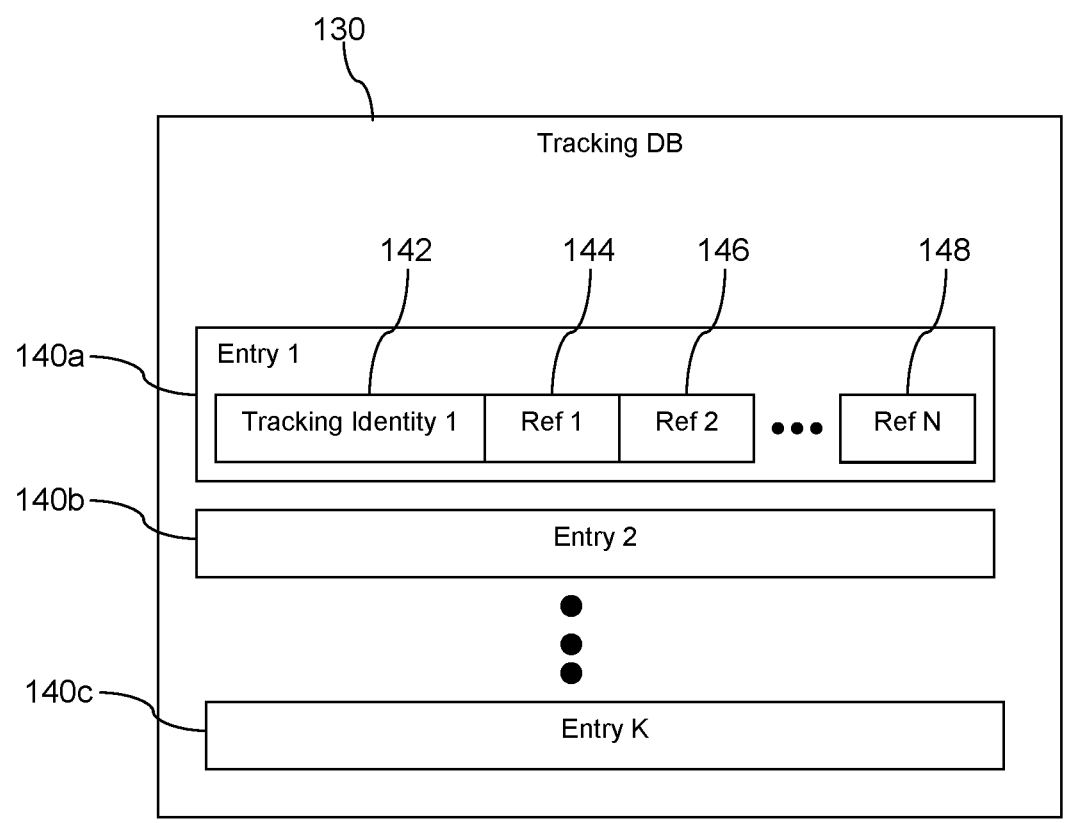
FIG. 2 is a block diagram of example data stored in a tracking date store according to an embodiment of the disclosure.

Turning now to FIG. 2, further details of the tracking data store 130 are described. In an embodiment, the tracking data store 130 may comprise a plurality of entries 140 that each associates a tracking identity 142 with one or more references. For example, the data store 130 may comprise a first entry 140a, a second entry 140b, and a k-th entry 140c, where the data store 130 comprises k-number of entries 140. The first entry 140a is illustrated as associating the tracking identity 142 to a first reference 144, to a second reference 146, and an N-th reference 148, where the entry 140a associates the tracking identity 142 to N-number of references. Entries 140 may associate a tracking identity 142 to one reference only. Entries 140 may associate a tracking identity 142 to two references, to three references, to four references, or to any number of references. The references may be URLs, IP addresses, or another reference or handle. The references may identify a server computer hosted by a stakeholder (i.e., a stakeholder server 124) that is communicatively coupled to the event tracking server 126 via the network 106.

With reference again to FIG. 1, in an alternative embodiment, the entry 140 in the tracking data store 130 may associate the tracking identity 142 to only a single reference 144, and the event tracking server application 128 may send notification of the click-through input event to only one stakeholder server 124—the one identified in the single reference 144. The stakeholder server 124 may then be responsible for forwarding the click-through input event to a second stakeholder server 124, and the second stakeholder server 124 may be responsible for forwarding the click-through input event to a third stakeholder server 124, and so on until all stakeholder servers 124 that are a party to the value chain of the subject tracking identity 142 are notified of the click-through input event. It is understood that a combination of event notification techniques may be employed by the system 100. For example, a first entry 140 may associate the tracking identity 142 with only a single reference 144 to a stakeholder server 124, in which case the event tracking server application 128 notifies that stakeholder server 124 of the click-through input event, and that stakeholder server 124 is responsible for notifying any other stakeholders that may be part of the value chain. A second entry 140 may associate the tracking identity 142 with a plurality of references, and the event tracking server application 128 may send notifications of a click-through input event to each of those stakeholder servers 124 identified in those references.

The client 120 may monitor events of mobile application installations. The status of the client 120 as a pre-loaded native application may allow it to access functions of an operating system of the device 102 that may be disallowed to applications that are not pre-loaded, for example to access operating system application programming interfaces (APIs) that support tracking mobile application events. When a mobile application is installed that is associated with a tracking identity, the client 120 logs this event and periodically and/or aperiodically sends the logs of the mobile application installation events to the event tracking server application 128. The event tracking server application 128 may access the tracking data store 130 using the tracking identity and notify one or more stakeholder servers 124 of the mobile application installation event in a manner similar to that of notifying of click-through events described in more detail above. When the client 120 monitors the event of the installation of a mobile application on the device 102 that is not associated with a tracking identity (e.g., a mobile application that is not affiliated with the tracking service and/or was not built using the SDK described above which configures the mobile application for affiliation and interaction with the tracking system) the client does not log that event and does not report this event to the event tracking server application 128.

The event tracking server application 128 may further associate the installation events to click-through input events, for example based on keeping a record of received click-through input events for a predefined period of time (e.g., 2 days, 7 days, 14 days, or some other predefined period of time) and based on linking the click-through input events to the installation events through the tracking identity. The event tracking server application 128 may determine a time lag that has passed between a click-through input event and a corresponding installation event to generate an attribution event. For example, if a mobile application is installed promptly after a click-through event (e.g., after a user has clicked on a mobile advertisement promoting the mobile application), the installation of the mobile application may be attributed to a mobile advertisement persuading the user of the device 102 to buy the mobile application, and some compensation may be due to some stakeholders in the value chain, for example to an advertising partner of a mobile application publisher. Attribution may be defined differently for different tracking identities (i.e., for different mobile advertisements). Some attributions may have a predefined time lag threshold of 2 days or less. Other attributions may have a predefined time lag threshold of 3 days or less. Other attributions may have a predefined time lag threshold of 7 days or less. The time lag threshold for each different mobile advertisement may be stored in the entries 140 associated to the tracking identity 142 in the tracking data store 130. The event tracking server application 128 may send a notification about the attribution event to one or more stakeholder servers 124 using the entries in the tracking data store 130.

In an embodiment, the entries 140 may comprise one or more references associated with stakeholder servers 124 that are to receive notifications of click-through input events, one or more references associated with stakeholder servers 124 that are to receive notifications of mobile application installation events, and one or more references associated with stakeholder servers 124 that are to receive notifications of attribution events. The entries 140 may further comprise an identification of a time lag threshold for attribution evaluation.

Figure 3A:
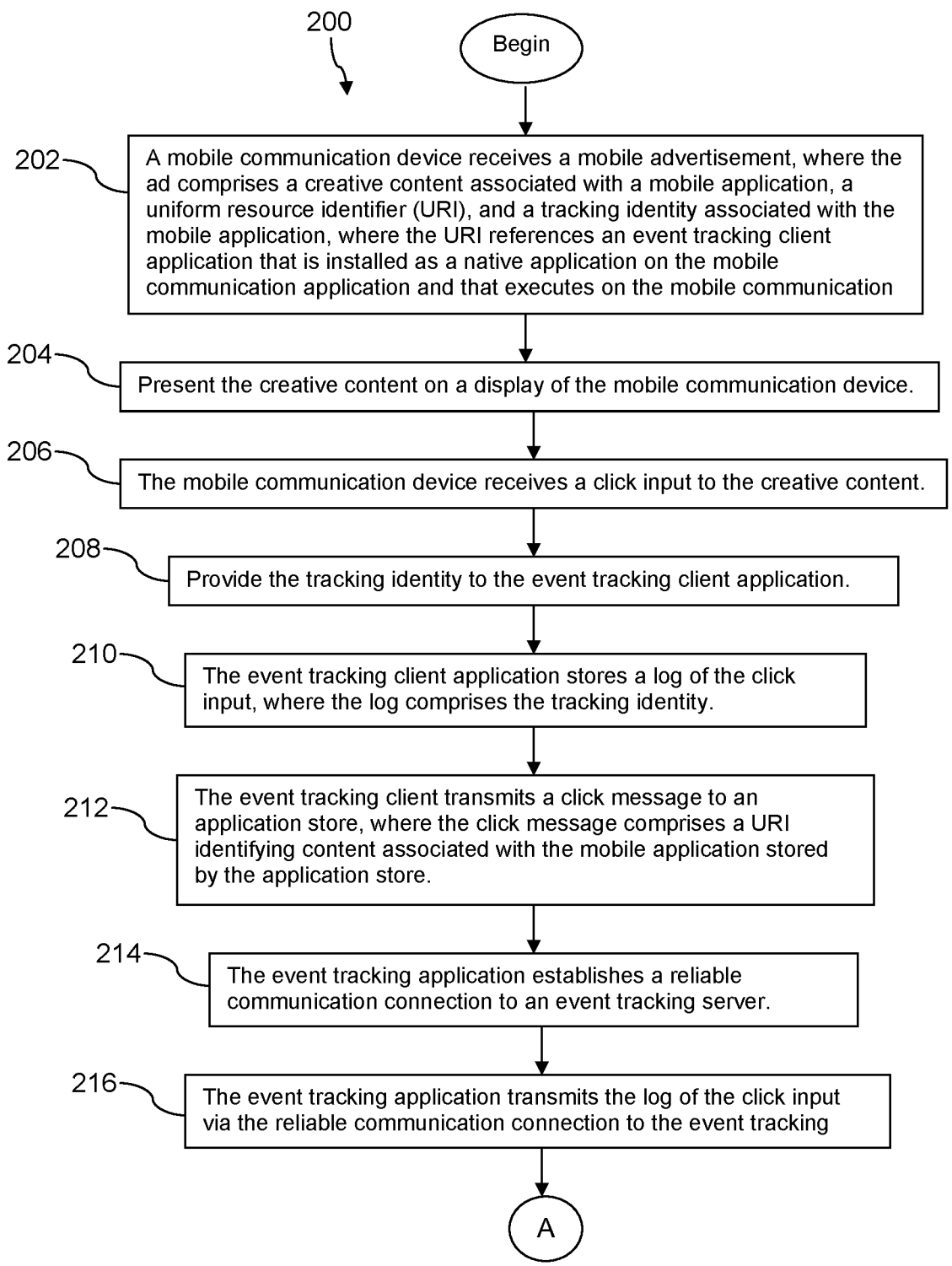
FIG. 3A and FIG. 3B are a flow chart of a method according to an embodiment of the disclosure.
Figure 3B:
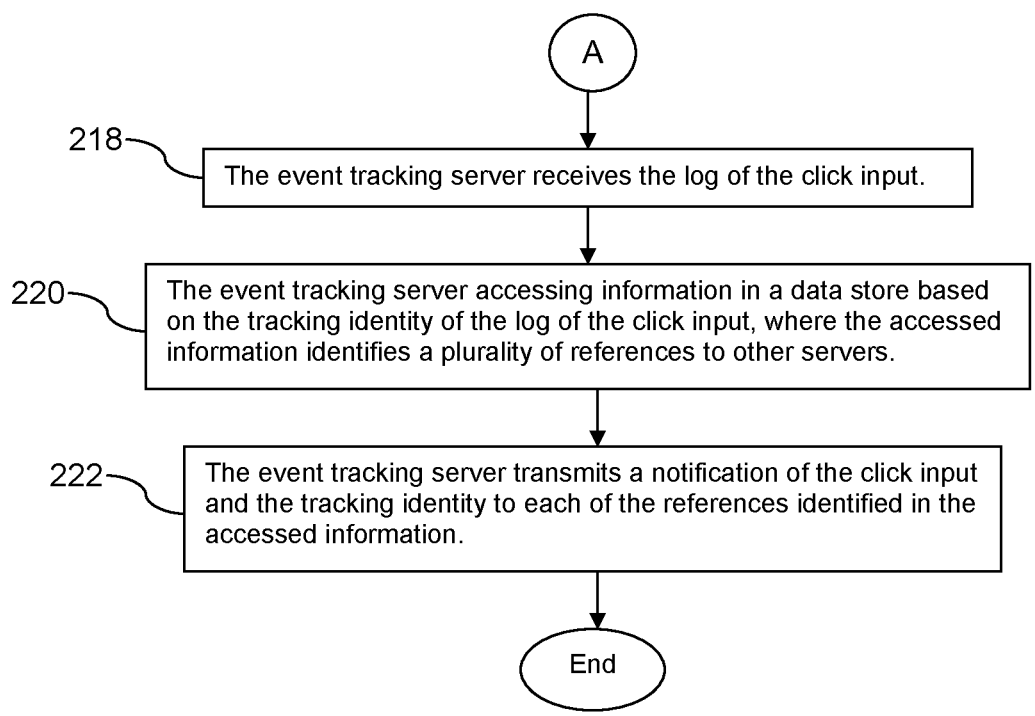

Turning now to FIG. 3A and FIG. 3B, a method 200 is described. In an embodiment, the method 200 may be performed to communicate events generated by a mobile communication device. For example, the method 200 may be used to notify an application store of a click input to select a content hosted by the application store and to notify a plurality of stakeholders associated with the subject content hosted by the application store. At block 202, a mobile communication device receives a mobile advertisement, where the ad comprises a creative content associated with a mobile application, a uniform resource identifier (URI), and a tracking identity associated with the mobile application, where the URI references an event tracking client application that is installed as a pre-loaded native application on the mobile communication application and that executes on the mobile communication device. In another embodiment, however, the event tracking client application is not a pre-loaded native application. In this alternative embodiment, the event tracking client application may not be pre-loaded but may be, notwithstanding, a native application (e.g., an application that is built for execution in a specific operating system, for example built as a binary executable in the specific operating system, such as an Android specific binary executable). This alternative embodiment, however, may be neither pre-loaded nor a native application. At block 204, the creative content is presented on a display of the mobile communication device. At block 206, the mobile communication device receives a click input to the creative content (e.g., receives a click-through input). At block 208, the tracking identity is provided to the event tracking client application. The mobile advertisement may have been made with an SDK that is compatible with the event tracking service, such that when the mobile advertisement is compiled or built using the SDK, the SDK automatically incorporates logic and/or instructions that are executed when the ad is clicked on which sends the URI to an operating system of the mobile communication device along with an tracking identity, and the operating system notifies the event tracking client application of the tracking identity.

The mobile advertisement may also send a URL associated with content at an application store to the operating system, and the operating system may send the URL to the event tracking client application along with the tracking identity. Alternatively the event tracking client application may be configured with the URL of the application store in advance, for example during fabrication of the mobile communication device or during an over-the-air firmware upgrade of the device (e.g., during a maintenance release or 'MR'). Alternatively, the event tracking client application may learn the URL of the application store by accessing the event tracking server.

At block 210, the event tracking client application stores a log of the click input, where the log comprises the tracking identity. At block 212, the event tracking client application transmits a click message to an application store, where the click message comprises a uniform resource identifier (URI) identifying content associated with the mobile application stored by the application store. The URI may identify an action and parameters of the action. For example, the URI may identify an action to display the mobile application install page and the parameters may comprise an identifier for a specific mobile application. At block 214, the event tracking client application establishes a reliable communication connection to an event tracking server. In another embodiment, however the event tracking client application may establish a communication channel that is not inherently reliable. For example, the event tracking client application may not employ an ACK-NACK communication protocol and may instead use an open-loop best effort communication strategy. At block 216, the event tracking client application transmits the log of the click input via the reliable communication connection (or any other communication channel) to the event tracking server.

At block 218, the event tracking server receives the log of the click input. At block 220, the event tracking server accesses information in a data store based on the tracking identity of the log of the click input, where the accessed information identifies a plurality of references to other servers. At block 222, the event tracking server transmits a notification of the click input and the tracking identity by the event tracking server to each of the references identified in the accessed information. The method 200 may be employed to reliably communicate the event of a click through on the mobile advertisement from the mobile communication device to stakeholders in a distribution chain of the mobile application and to enable the mobile communication device to access information about the mobile application from the application store, for example without delays or confusing messages presented on the display of the device.

The method 200 may further comprise determining by the event tracking client application that a mobile application has been installed; storing by the event tracking client application a log of the installation of the mobile application comprising a second tracking identity; transmitting the log of the installation of the mobile application by the event tracking client application to the event tracking server; and transmitting a notification of the installation of the mobile application by the event tracking server where the notification comprises the second tracking identity.

The method 200 may further comprise determining by the event tracking server that the tracking identity and the second tracking identity are the same; determining by the event tracking server an elapsed time between the time of the log of the click input and the log of the installation of the mobile application; determining that the elapsed time is less than a predefined attribution time threshold; and based on the elapsed time being less than the predefined attribution time threshold, transmitting a notification of attribution by the event tracking server.

Figure 4:
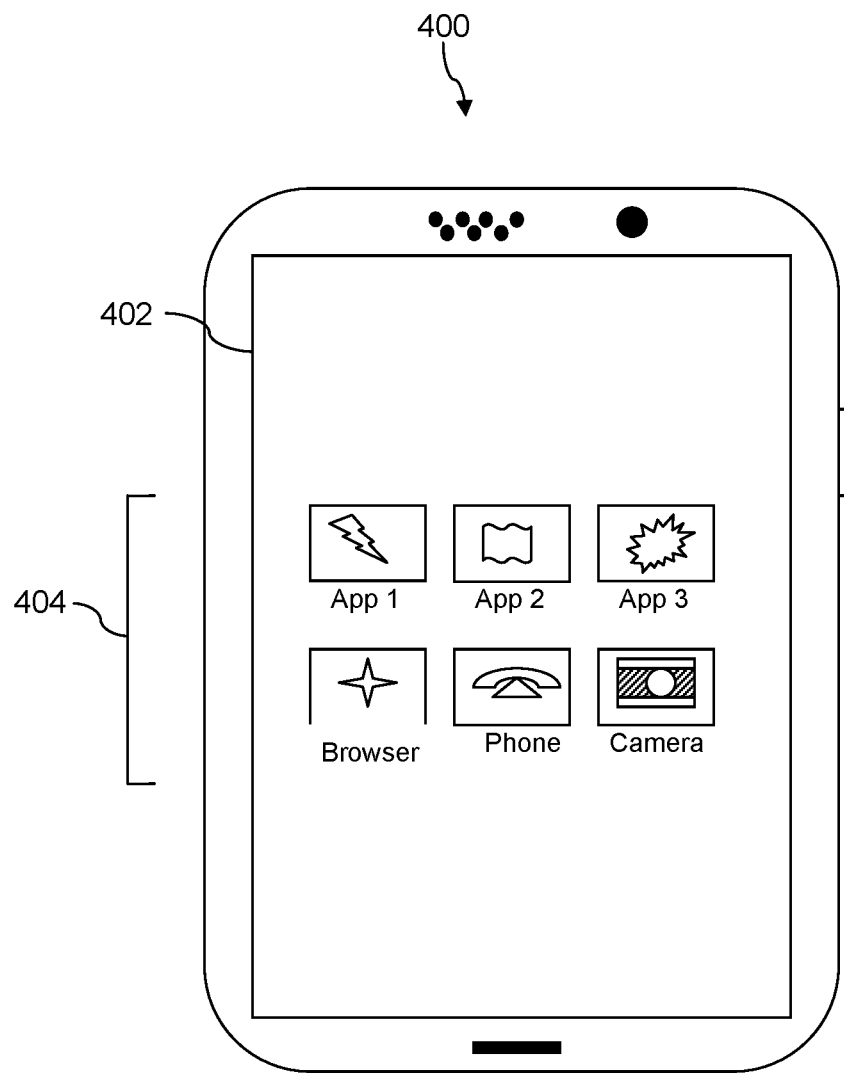
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
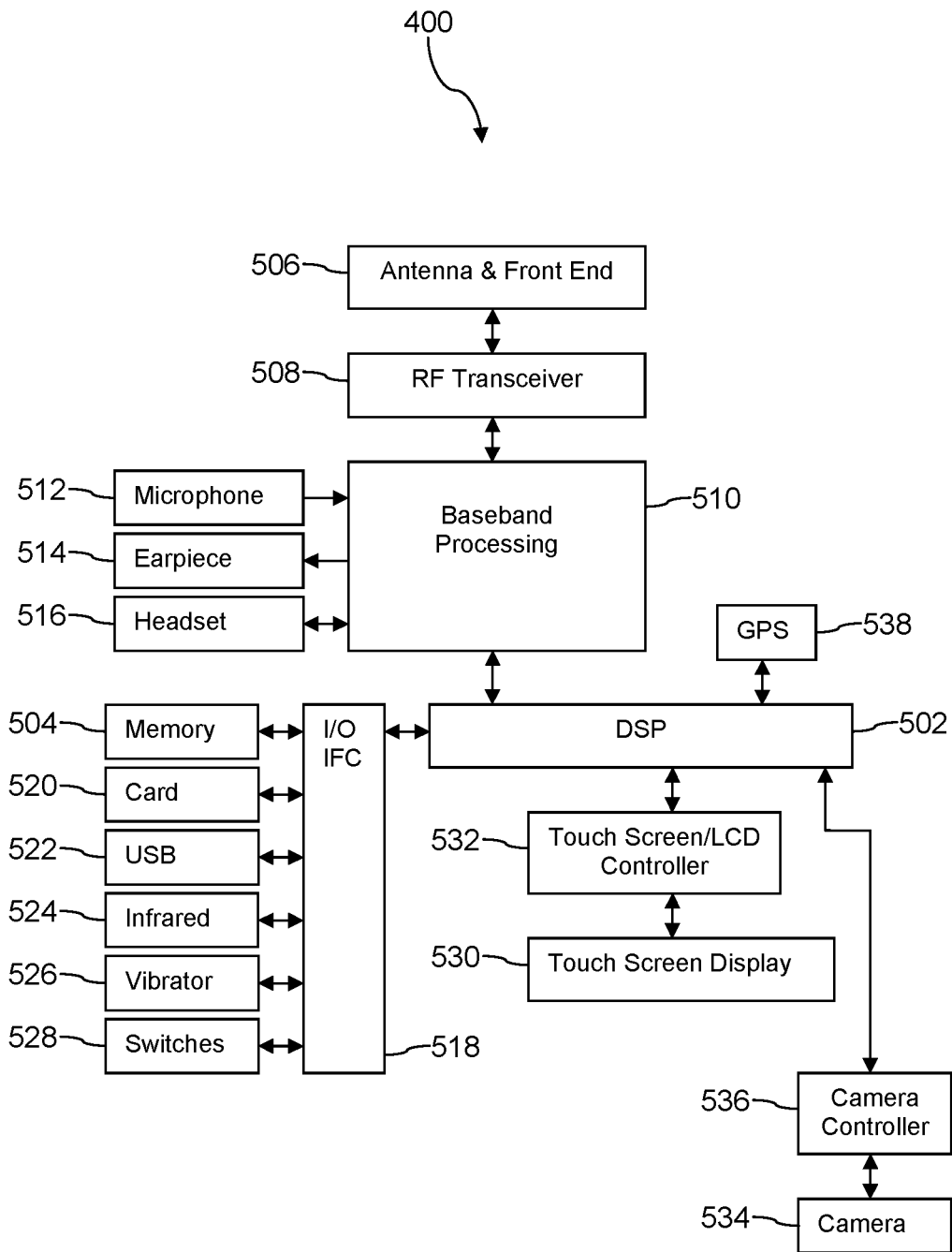
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
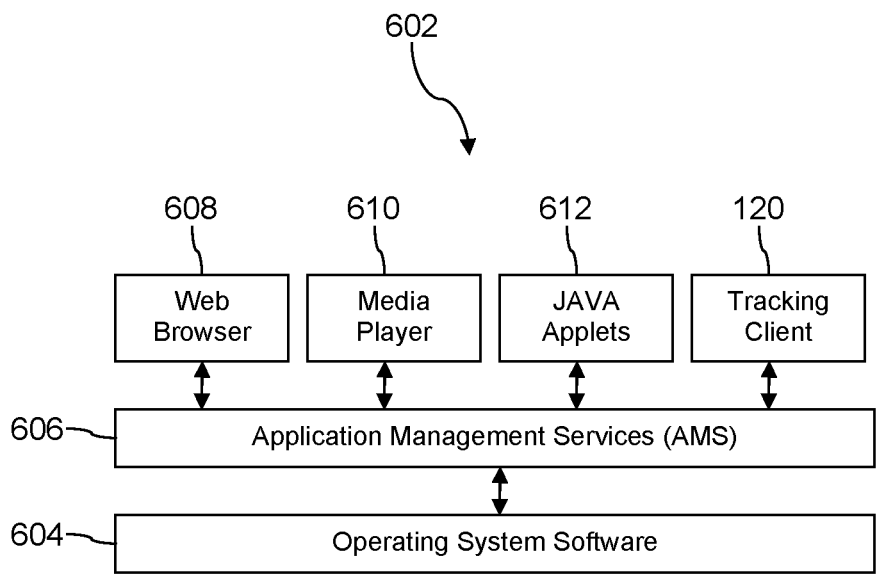
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The event tracking client application 120 may likewise execute in the context of the AMS 606.

Figure 6B:
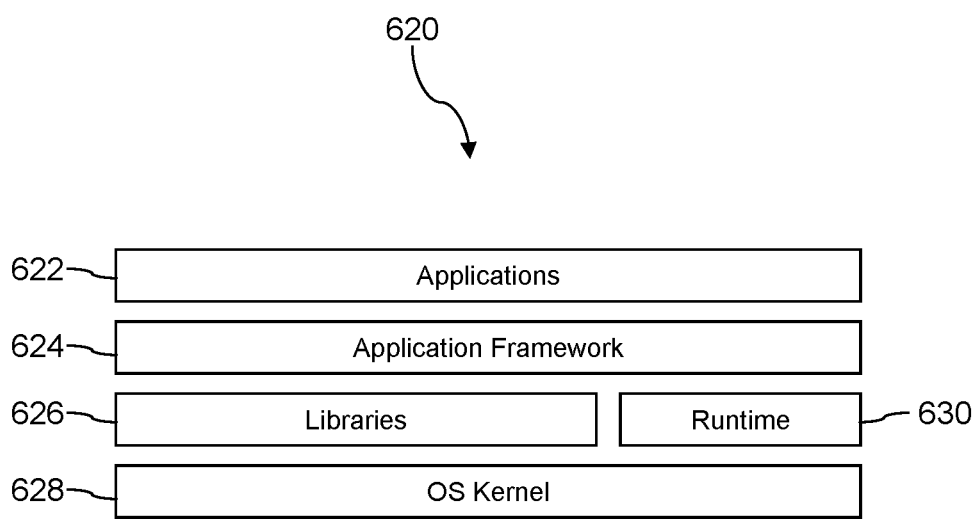
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. In an embodiment, the event tracking client application 120 may be implemented as one of the libraries 626 or may be implemented as a part of the application framework 624 or may be implemented as part of the runtime 630.

Figure 7:
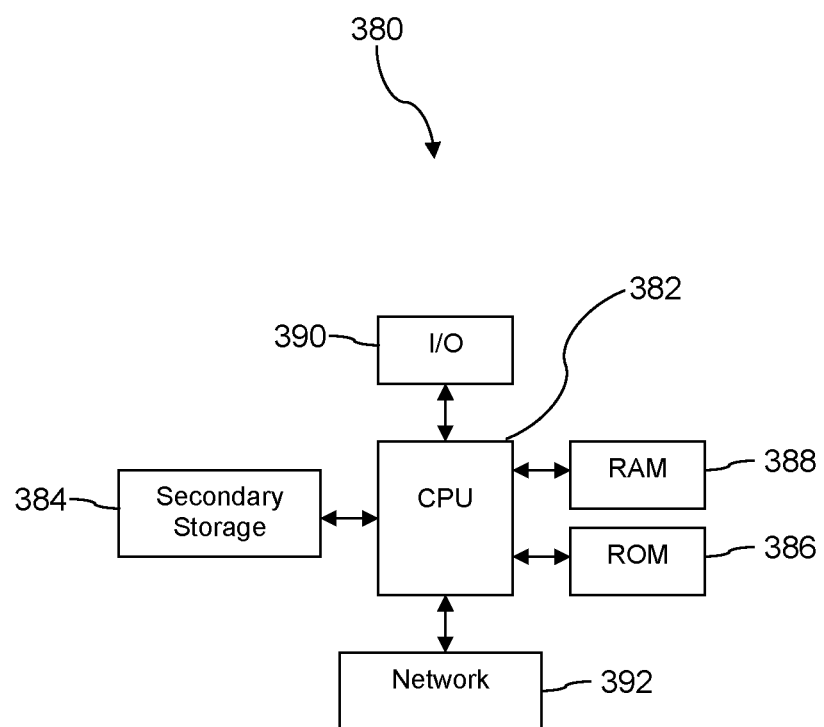
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicating events generated by a mobile communication device, comprising:
   receiving a mobile advertisement by a mobile communication device, where the ad comprises a creative content associated with a mobile application, a uniform resource identifier (URI), and a tracking identity associated with the mobile application, where the URI references an event tracking client application that is installed as a pre-loaded native application on the mobile communication device and that executes on the mobile communication device;
   presenting the creative content on a display of the mobile communication device;
   receiving a click input to the creative content by the mobile communication device;
   providing the tracking identity to the event tracking client application;
   storing a log of the click input by the event tracking client application, where the log comprises the tracking identity;
   transmitting a click message to an application store by the event tracking client application, where the click message comprises a uniform resource identifier (URI) identifying content associated with the mobile application stored by the application store;
   establishing a reliable communication connection to an event tracking server by the event tracking client application;
   transmitting the log of the click input by the event tracking client application via the reliable communication connection to the event tracking server;
   receiving the log of the click input by the event tracking server;
   accessing information in a data store by the event tracking server based on the tracking identity of the log of the click input, where the accessed information identifies a reference to a server; and
   transmitting a notification of the click input and the tracking identity by the event tracking server to the server associated with the reference identified in the accessed information,
   whereby the event of a click through on the mobile advertisement is communicated from the mobile communication device to stakeholders in a distribution chain of the mobile application and the mobile communication device is enabled to access information about the mobile application from the application store.

2. The method of claim 1, wherein the accessed information in the data store identifies a plurality of references to servers and the event tracking server transmits a notification of the click input and the tracking identity to each of the servers associated with the references identified in the accessed information.

3. The method of claim 1, further comprising:
   determining by the event tracking client application that a mobile application has been installed;
   storing by the event tracking client application a log of the installation of the mobile application comprising a second tracking identity;
   transmitting the log of the installation of the mobile application by the event tracking client application to the event tracking server; and
   transmitting a notification of the installation of the mobile application by the event tracking server where the notification comprises the second tracking identity.

4. The method of claim 3, further comprising:
determining by the event tracking server that the tracking identity and the second tracking identity are the same;
determining by the event tracking server an elapsed time between the time of the log of the click input and the log of the installation of the mobile application;
determining that the elapsed time is less than a predefined attribution time threshold; and
based on the elapsed time being less than the predefined attribution time threshold, transmitting a notification of attribution by the event tracking server.

5. The method of claim 1, wherein installation of the event tracking client application as a pre-loaded native application comprises installation of the event tracking client application on the mobile communication device during manufacturing and comprises operating system access privileges greater than the privileges granted to user installed mobile applications.

6. The method of claim 1, wherein the mobile communication device is one of a mobile phone, a smartphone, a personal digital assistant (PDA), a media player, a wearable computer, a headset computer, a laptop computer, a tablet computer, or a notebook computer.

7. The method of claim 1, wherein the communication connection comprises the event tracking server sending one of an ACK or a NACK message response to the event tracking client application in response to receiving the log of the click input by the event tracking server.

8. A mobile communication device, comprising:
a processor;
a non-transitory memory;
a display;
an input device; and
a tracking client pre-loaded native application stored in the non-transitory memory and referenced by a uniform resource identifier (URI) that, when executed by the processor:
receives a tracking identity of a mobile advertisement presented on the display from another application installed on the mobile communication device sent based on the URI associated with the tracking client pre-loaded native application;
in response to receiving the tracking identity of the mobile advertisement, stores a log of a click input associated with the mobile advertisement;
in response to receiving the tracking identity of the mobile application, transmits a click message to an application store, where the click message comprises a uniform resource identifier (URI) identifying content associated with the mobile application stored by the application store;
establishes a communication connection to an event tracking server; and
transmits the log of the click input via the communication connection to the event tracking server.

9. The mobile communication device of claim 8, wherein the mobile communication device is one of a mobile phone, a smartphone, a personal digital assistant (PDA), a media player, a wearable computer, a headset computer, a laptop computer, a tablet computer, or a notebook computer.

10. The mobile communication device of claim 8, wherein the application further determines that a mobile application has been installed;
stores a log of the installation of the mobile application comprising a second tracking identity; and
transmits the log of the installation of the mobile application to the event tracking server.

11. The mobile communication device of claim 8, further comprising the another application different from the tracking client application stored in the non-transitory memory that, when executed by the processor:
receives the mobile advertisement comprising a creative content of the advertisement, the tracking identity, and the URI,
causes the presentation of the creative content on the display, and
sends the tracking identity to the tracking client application.

12. The mobile communication device of claim 11, where the another application different from the tracking client application is one of a web browser application, a mobile gaming application, or a social networking application.

13. The mobile communication device of claim 8, wherein the communication connection comprises the tracking client application determining that a NACK message is received from the event tracking server and transmitting the log of the click input to the event tracking server again.

14. The mobile communication device of claim 8, wherein the communication connection comprises the tracking client application determining a cyclic redundancy check (CRC) value over at least a portion of the log of the click input and transmitting the CRC value with the log of the click input to the event tracking server.

15. A method of communicating events generated by a mobile communication device, comprising:
receiving a mobile advertisement by a mobile communication device, where the ad comprises a creative content associated with a mobile application, a uniform resource identifier (URI), and a tracking identity associated with the mobile application, where the URI references an event tracking client application that is installed on the mobile communication device and that executes on the mobile communication device;
presenting the creative content on a display of the mobile communication device;
receiving a click input to the creative content by the mobile communication device;
providing the tracking identity to the event tracking client application;
storing a log of the click input by the event tracking client application, where the log comprises the tracking identity;
transmitting a click message to an application store by the event tracking client application, where the click message comprises a uniform resource identifier (URI) identifying content associated with the mobile application stored by the application store;
establishing a communication connection to an event tracking server by the event tracking client application; and
transmitting the log of the click input by the event tracking client application via the communication connection to the event tracking server.

16. The method of claim 15, wherein the mobile communication device is one of a mobile phone, a smartphone, a personal digital assistant (PDA), a media player, a wearable computer, a headset computer, a laptop computer, a tablet computer, or a notebook computer.

17. The method of claim 15, where the event tracking client application establishes the communication connection at least in part over one of a wireless communication link provided according to a long term evolution (LTE), a code division multiple access (CDMA), a global system for mobile communications (GSM), or a worldwide interoperability for microwave access (WiMAX) wireless communication protocol.

18. The method of claim 15, where the event tracking client application establishes the communication connection at least in part over one of a WiFi communication link.

19. The method of claim 15, where the tracking identity is provided to the event tracking client application by another application executing on the mobile communication device based on the URI.

20. The method of claim 19, where the another application is one of a web browser application, a mobile gaming application, and a mobile social networking application.

* * * * *